(12) United States Patent
Chiu et al.

(10) Patent No.: US 11,548,031 B2
(45) Date of Patent: Jan. 10, 2023

(54) ARRAY-TYPE ULTRASONIC SENSOR

(71) Applicant: SONICMEMS (ZHENGZHOU) TECHNOLOGY CO., LTD., Zhengzhou (CN)

(72) Inventors: Yi-Hsiang Chiu, Taipei (TW); Hung-Ping Lee, Taipei (TW)

(73) Assignee: SONICMEMS (ZHENGZHOU) TECHNOLOGY CO., LTD., Zhengzhou (CN)

( * ) Notice: Subject to any disclaimer, the term of this patent is extended or adjusted under 35 U.S.C. 154(b) by 0 days.

(21) Appl. No.: 17/333,681

(22) Filed: May 28, 2021

(65) Prior Publication Data

US 2022/0226862 A1 Jul. 21, 2022

(30) Foreign Application Priority Data

Jan. 21, 2021 (TW) .................................. 110102393

(51) Int. Cl.
*B06B 1/06* (2006.01)
*G01N 29/22* (2006.01)

(52) U.S. Cl.
CPC ......... *B06B 1/0629* (2013.01); *G01N 29/223* (2013.01); *G01N 2291/106* (2013.01)

(58) Field of Classification Search
CPC ................ B06B 1/0629; G01N 29/223; G01N 2291/106
See application file for complete search history.

(56) References Cited

U.S. PATENT DOCUMENTS

| | | | | |
|---|---|---|---|---|
| 2013/0049039 A1* | 2/2013 | Vadhavkar | .............. | H01L 33/54 257/E31.127 |
| 2014/0292941 A1* | 10/2014 | Kobayashi | ............. | B41J 2/1629 347/68 |
| 2015/0027228 A1* | 1/2015 | Endo | .................... | G01N 29/262 73/641 |
| 2015/0151330 A1* | 6/2015 | Tsuruno | ................ | B06B 1/0622 367/13 |
| 2016/0339476 A1* | 11/2016 | Joyce | ..................... | G10K 9/122 |

* cited by examiner

*Primary Examiner* — Randy W Gibson
*Assistant Examiner* — John M Royston
(74) *Attorney, Agent, or Firm* — Muncy, Geissler, Olds & Lowe, P.C.

(57) ABSTRACT

An array-type ultrasonic sensor includes a semiconductor substrate, a first sensing array, and a second sensing array. The first sensing array includes a plurality of first ultrasonic sensing units. Each of the first ultrasonic sensing units includes a first positive electrode and a first negative electrode. The first positive electrodes are connected in series with each other, and the first negative electrodes are connected in series with each other. The second sensing array includes a plurality of second ultrasonic sensing units. Each of the second ultrasonic sensing units includes a second positive electrode and a second negative electrode. The second positive electrodes are connected in series with each other, and the second negative electrodes are connected in series with each other. One of the first sensing array and the second sensing array is configured to transmit ultrasonic waves, and the other is configured to receive reflected ultrasonic waves.

9 Claims, 5 Drawing Sheets

ARRAY-TYPE ULTRASONIC SENSOR

CROSS-REFERENCE TO RELATED APPLICATION

This non-provisional application claims priority under 35 U.S.C. § 119(a) to Patent Application No. 110102393 filed in Taiwan, R.O.C. on Jan. 21, 2021, the entire contents of which are hereby incorporated by reference.

BACKGROUND

Technical Field

The present invention relates to the field of sensing, and in particular, to an array-type ultrasonic sensor.

Related Art

An ultrasonic sensor is generally designed with a hollow chamber, which enables the ultrasonic sensor to effectively distinguish between a transmitted ultrasonic wave and a reflected ultrasonic wave through a transmission time and a transmission phase. Therefore, the ultrasonic sensor is widely applied to identification of various physiological information.

With electronic devices used in combination with the ultrasonic sensor becoming thinner and lighter, the size of the hollow chamber needs to be reduced to make the ultrasonic sensor thinner and lighter. However, the reduction in a volume of the chamber may result in the reception of a reflected ultrasonic wave before the ultrasonic sensor stops vibrating, which may cause determination errors. Although this can be achieved by adding additional sensors, problems such as an excessively large angle of reflection and an excessively low sound pressure remain, which affect the sensitivity and sensing effects of the ultrasonic sensor.

SUMMARY

In order to solve the problems in the prior art, an array-type ultrasonic sensor is provided herein. The array-type ultrasonic sensor includes a semiconductor substrate, a first sensing array, and a second sensing array. The first sensing array is disposed on the semiconductor substrate and includes a plurality of first ultrasonic sensing units. Each of the first ultrasonic sensing units includes a first positive electrode and a first negative electrode. The first positive electrodes of the first ultrasonic sensing units are connected in series with each other, and the first negative electrodes of the first ultrasonic sensing units are connected in series with each other. The second sensing array is disposed on the semiconductor substrate and includes a plurality of second ultrasonic sensing units. Each of the second ultrasonic sensing units includes a second positive electrode and a second negative electrode. The second positive electrodes of the second ultrasonic sensing units are connected in series with each other, and the second negative electrodes of the second ultrasonic sensing units are connected in series with each other. One of the first sensing array and the second sensing array is configured to transmit an ultrasonic wave, and the other is configured to receive a reflected ultrasonic wave.

In some embodiments, a number of the first ultrasonic sensing units in the first sensing array is different from a number of the second ultrasonic sensing units in the second sensing array. In more detail, in some embodiments, the first ultrasonic sensing units in the first sensing array are arranged in a rectangle, and the second sensing array is surrounded by the rectangle.

In some embodiments, the first ultrasonic sensing units and the second ultrasonic sensing units are jointly arranged in a matrix, and the first ultrasonic sensing units are arranged alternately with the second ultrasonic sensing units in adjacent oblique lines.

In some embodiments, the first ultrasonic sensing units and the second ultrasonic sensing units are jointly arranged in an array, and the first ultrasonic sensing units are arranged alternately with the second ultrasonic sensing units in a column or in a row.

In some embodiments, a number of the first ultrasonic sensing units in the first sensing array is the same as a number of the second ultrasonic sensing units in the second sensing array. In more detail, in some embodiments, the first ultrasonic sensing units are arranged in a first matrix, and the second ultrasonic sensing units are arranged in a second matrix. The first matrix and the second matrix are arranged adjacent to each other.

In some embodiments, the first positive electrodes and the second positive electrodes are made of n-type aluminum nitride ($AlN^+$), and the first negative electrodes and the second negative electrodes are made of p-type aluminum nitride ($AlN^-$).

In some embodiments, a height of a hollow chamber in each of the first ultrasonic sensing units and each of the second ultrasonic sensing units ranges from 0.8 mm to 1.5 mm.

In the above embodiment, by connecting a plurality of first ultrasonic sensing units in series to form a first sensing array, connecting a plurality of second ultrasonic sensing units in series to form a second sensing array, and respectively transmitting and receiving ultrasonic waves, various problems in the conventional art can be resolved, so that lightness and thinness can be achieved, thus improving the sound pressure and the sensitivity of sensing.

DETAILED DESCRIPTION

Figure 1:
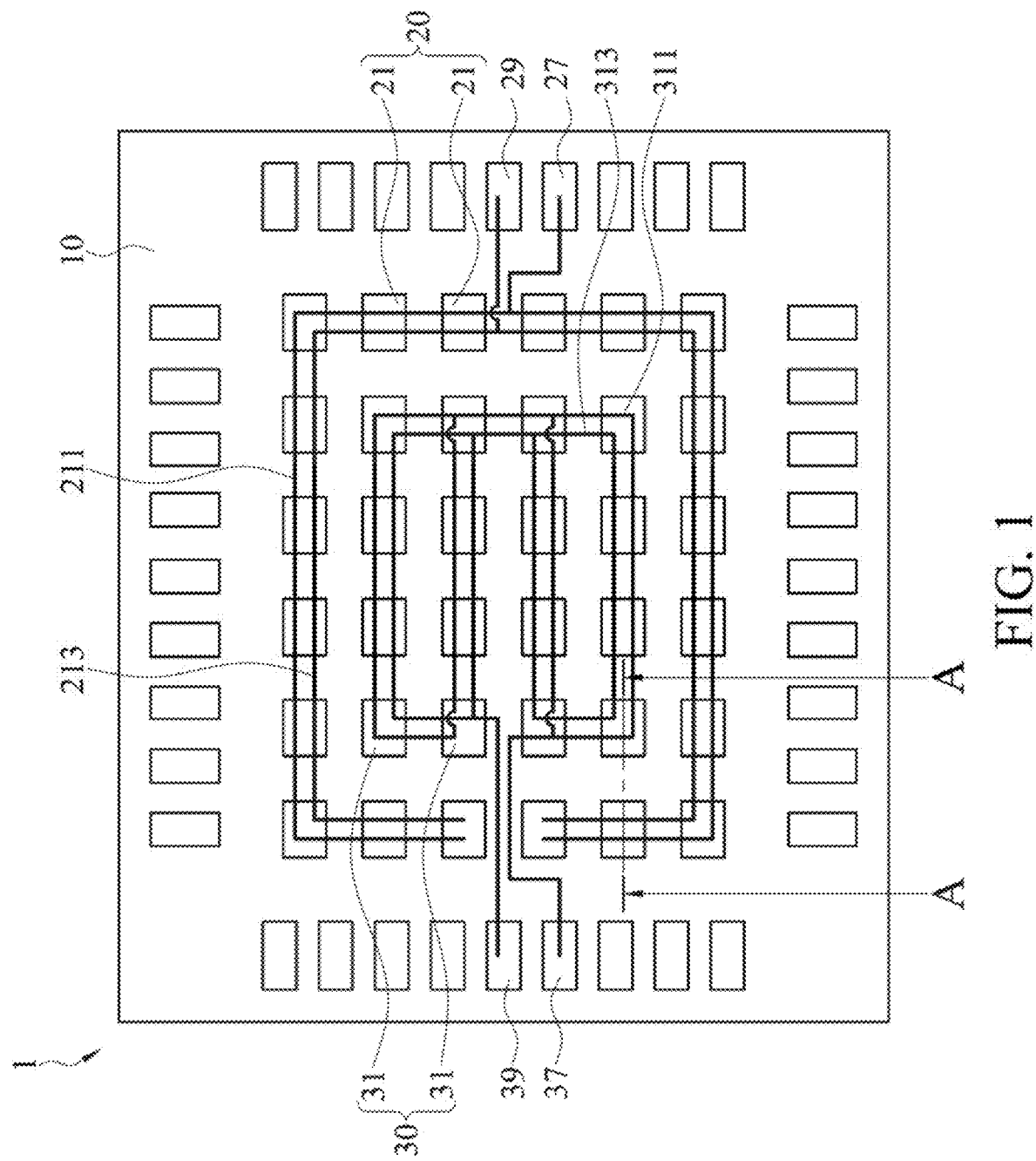
FIG. 1 is a top view of a first embodiment of an array-type ultrasonic sensor.

It should be understood that when an element is referred to as being "connected" to or "disposed" on another element, it may indicate that the element is directly on the other element, or there may also be an intermediate element, and the element is connected to another element through the intermediate element. On the contrary, when an element is referred to as being "directly on another element" or "directly connected to another element", it may be understood that at this time, it is clearly defined that there is no intermediate element.

In addition, terms "first", "second", and "third" are only used to distinguish one element, component, region, or section from another element, component, region, layer, or section, rather than indicating an inevitable sequence therebetween. In addition, relative terms such as "under" and "upper" may be used herein to describe a relationship between one element and another element. It should be understood that relative terms are intended to include differences in devices other than the devices at the orientation shown in the drawing. For example, if the device in one accompanying drawing is flipped, elements described as being on "lower" sides of other elements are to be oriented on "upper" sides of the other elements. This only represents a relative position relationship, not an absolute position relationship.

FIG. 1 is a top view of a first embodiment of an array-type ultrasonic sensor. As shown in FIG. 1, an array-type ultrasonic sensor 1 includes a semiconductor substrate 10, a first sensing array 20, and a second sensing array 30. The first sensing array 20 is disposed on the semiconductor substrate 10 and includes a plurality of first ultrasonic sensing units 21. Each of the first ultrasonic sensing units 21 includes a first positive electrode 211 and a first negative electrode 213. The first positive electrodes 211 of the first ultrasonic sensing units 21 are connected in series with each other, and the first negative electrodes 213 of the first ultrasonic sensing units 21 are connected in series with each other. Therefore, through the serial connection, the plurality of first ultrasonic sensing units 21 form the first sensing array 20.

The second sensing array 30 is disposed on the semiconductor substrate 10 and includes a plurality of second ultrasonic sensing units 31. Each of the second ultrasonic sensing units 31 includes a second positive electrode 311 and a second negative electrode 313. The second positive electrodes 311 of the second ultrasonic sensing units 31 are connected in series with each other, and the second negative electrodes 313 of the second ultrasonic sensing units 31 are connected in series with each other. Therefore, through the serial connection, the plurality of second ultrasonic sensing units 31 form the second sensing array 30. Here, one of the first sensing array 20 and the second sensing array 30 is configured to transmit an ultrasonic wave, and the other is configured to receive a reflected ultrasonic wave.

In other words, by forming the first sensing array 20 with the plurality of first ultrasonic sensing units 21 and forming the second sensing array 30 with the plurality of second ultrasonic sensing units 31, a relatively high sound pressure is generated while the array-type ultrasonic sensor 1 is lighter and thinner. In addition, the first sensing array 20 and the second sensing array 30 may be respectively defined as a transmitting terminal/receiving terminal and a receiving terminal/transmitting terminal, and therefore, one-way transmission can be ensured to avoid noise interference.

Referring to FIG. 1 again, a number of the first ultrasonic sensing units 21 in the first sensing array 20 is different from a number of the second ultrasonic sensing units 31 in the second sensing array 30. In more detail, the first ultrasonic sensing units 21 in the first sensing array 20 are arranged in a rectangle, and the second sensing array 30 is surrounded by the rectangle. In this way, the first ultrasonic sensing units 21 are adjacent to the second ultrasonic sensing units 31, thus constituting a combination of a plurality of transmitting terminals/receiving terminals, so that waves incident/reflected at various angles can be sensed.

Here, the first positive electrodes 211 and the second positive electrodes 311 are made of n-type aluminum nitride (AlN+), and the first negative electrodes 213 and the second negative electrodes 313 are made of p-type aluminum nitride (AlN), or vice versa. In addition, the first positive electrodes 211, the second positive electrodes 311, the first negative electrodes 213, and the second negative electrodes 313 can be connected in series through solder pads and metal wires and then connected in series to peripheral contact areas 27, 37, 29, 39. However, this is merely by way of example and not limitation. The connection method shown in the figure is merely an example and is not an actual connection method. In fact, the connection may be performed through metal plating and lithographic etching.

Figure 2:
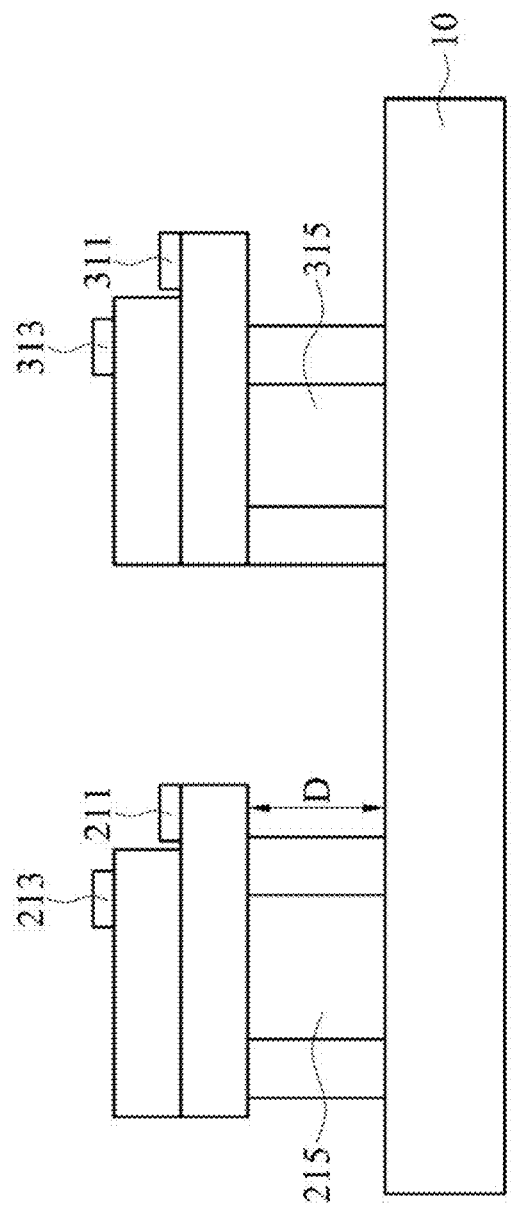
FIG. 2 is a partial cross-sectional view of the first embodiment of the array-type ultrasonic sensor.

FIG. 2 is a partial cross-sectional view of the first embodiment of the array-type ultrasonic sensor. As shown in FIG. 2, referring to FIG. 1 together, in fact, the first ultrasonic sensing units 21 and the second ultrasonic sensing units 31 may be a same piezoelectric sensing element, and evacuated hollow chambers 215 and 315 are used to distinguish between an incident wave and a reflected wave. A height D of each of the hollow chambers 215 and 315 in each of the first ultrasonic sensing units 21 and each of the second ultrasonic sensing units 31 ranges from 0.8 mm to 1.5 mm, preferably 1 mm to 1.2 mm. By arranging the first ultrasonic sensing units 21 and the second ultrasonic sensing units 31 as an array, even if the heights of the hollow chambers 215, 315 are limited and the sound pressure is limited, a good sensing effect can still be achieved through the array.

Figure 3:
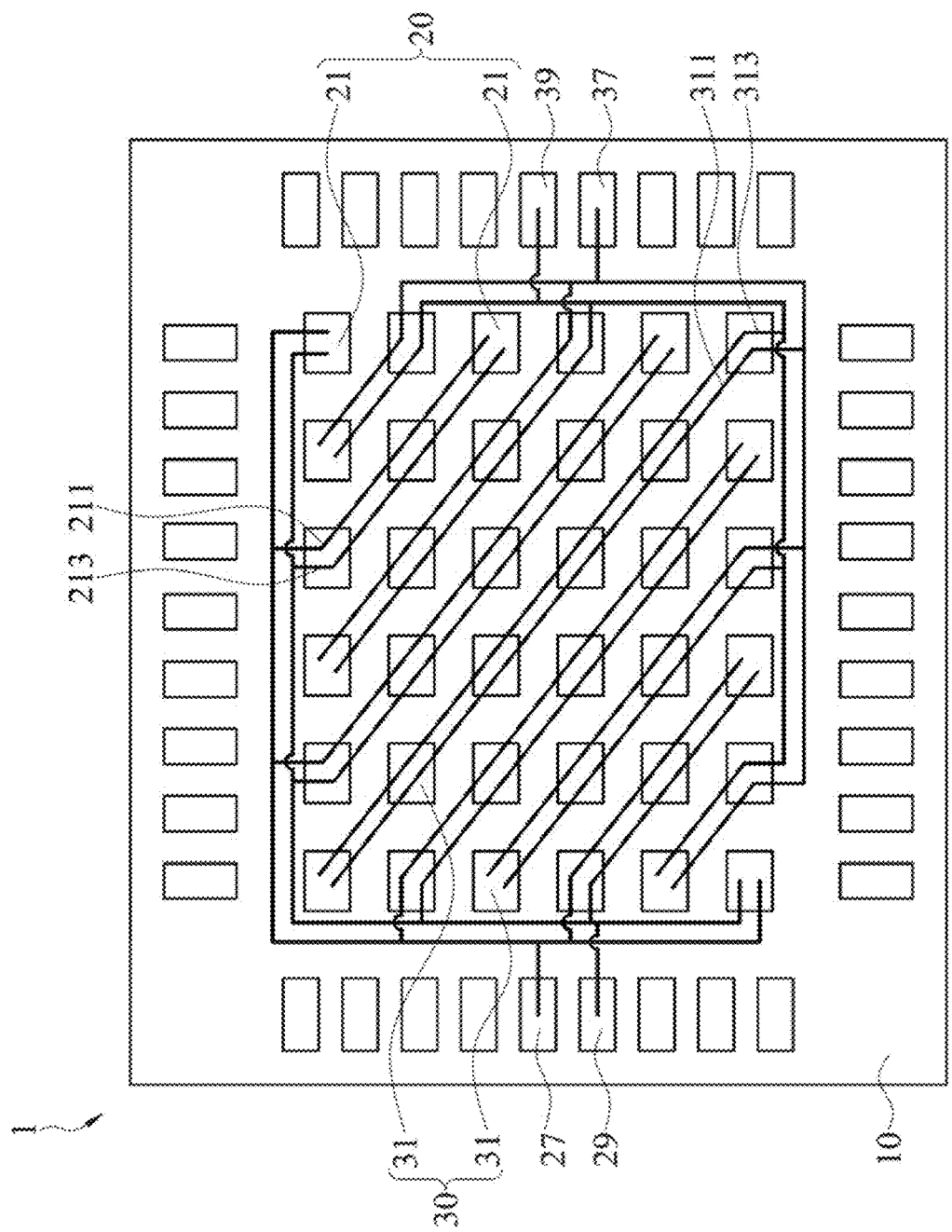
FIG. 3 is a top view of a second embodiment of the array-type ultrasonic sensor.

FIG. 3 is a top view of a second embodiment of the array-type ultrasonic sensor. As shown in FIG. 3, the first ultrasonic sensing units 21 and the second ultrasonic sensing units 31 are jointly arranged in a single array, and the first ultrasonic sensing units 21 are arranged alternately with the second ultrasonic sensing units 31 in the same column and in the same row. In other words, the first ultrasonic sensing units 21 are adjacent to the second ultrasonic sensing units 31 in both lateral and vertical directions. A shape of the array may be rectangular, triangular, trapezoidal, rhombus, and the like, but is not limited thereto. A 6×6 matrix is used as an example in FIG. 3. The first ultrasonic sensing units 21 and the second ultrasonic sensing units 31 are jointly arranged in a matrix, and the first ultrasonic sensing units 21 are not only arranged alternately with the second ultrasonic sensing units 31 in the same column and in the same row, but also arranged alternately in adjacent oblique lines. In other words, the first positive electrodes 211, the second positive electrodes 311, the first negative electrodes 213, and the second negative electrodes 313 are connected in series in oblique lines, and then connected to peripheral contact areas 27, 37, 29, 39.

In the second embodiment, numbers of the first ultrasonic sensing units 21 and the second ultrasonic sensing units 31 are the same, for example, but may actually be different. An actual circuit layout can be adjusted according to the area to be sensed.

Figure 4:
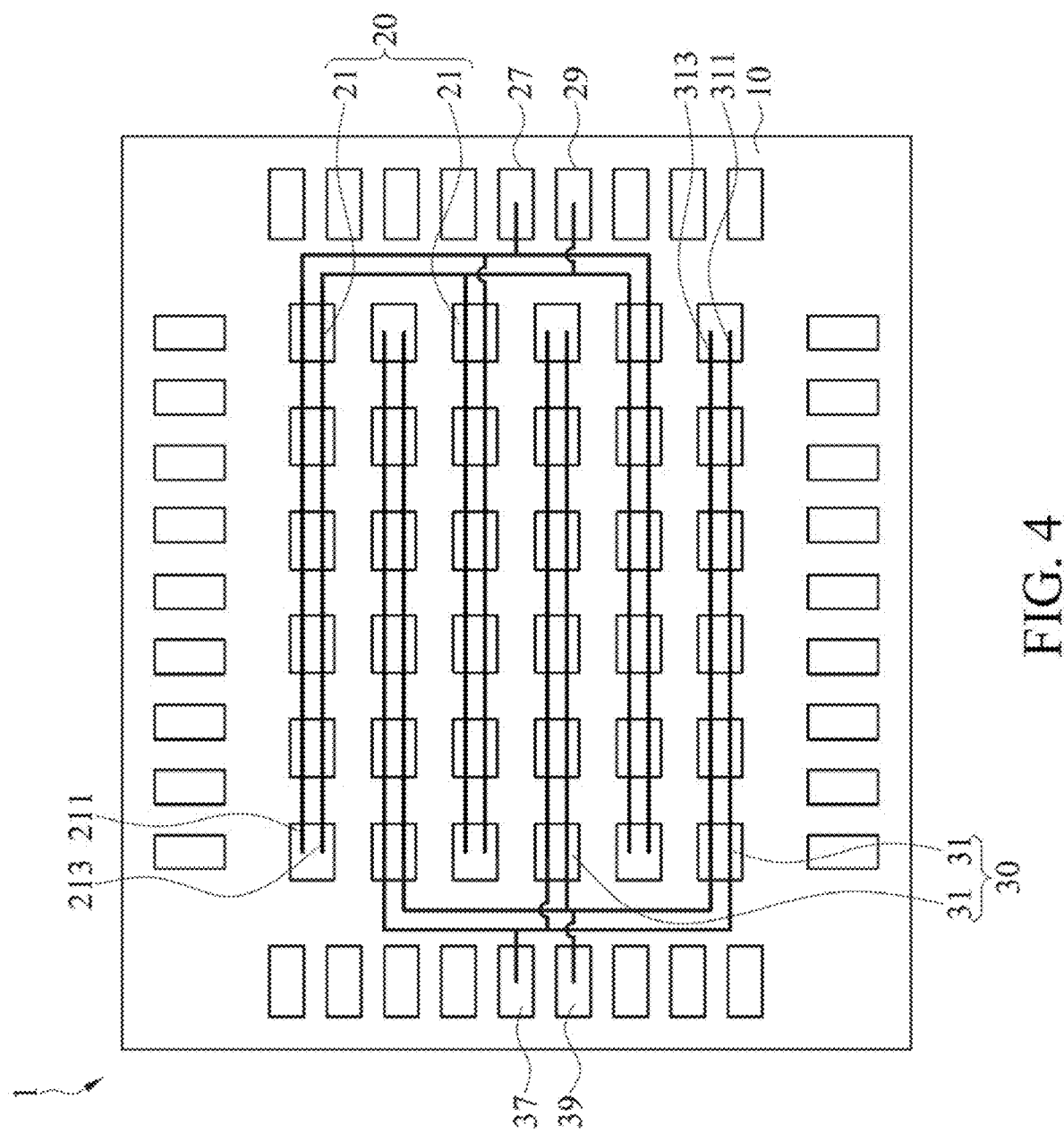
FIG. 4 is a top view of a third embodiment of the array-type ultrasonic sensor.

FIG. 4 is a top view of a third embodiment of the array-type ultrasonic sensor. As shown in FIG. 4, in the third embodiment, the first ultrasonic sensing units 21 and the second ultrasonic sensing units 31 are jointly arranged in an array, and the first ultrasonic sensing units 21 are arranged alternately with the second ultrasonic sensing units 31 in a column. However, the above is merely an example. If the pattern is inverted, the first ultrasonic sensing units 21 are arranged alternately with the second ultrasonic sensing units 31 in a row. Similarly, this is designed in such a way that the first ultrasonic sensing units 21 are adjacent to the second ultrasonic sensing units 31, thus constituting a combination of a plurality of transmitting terminals/receiving terminals, so that waves incident/reflected at various angles can be sensed.

Figure 5:
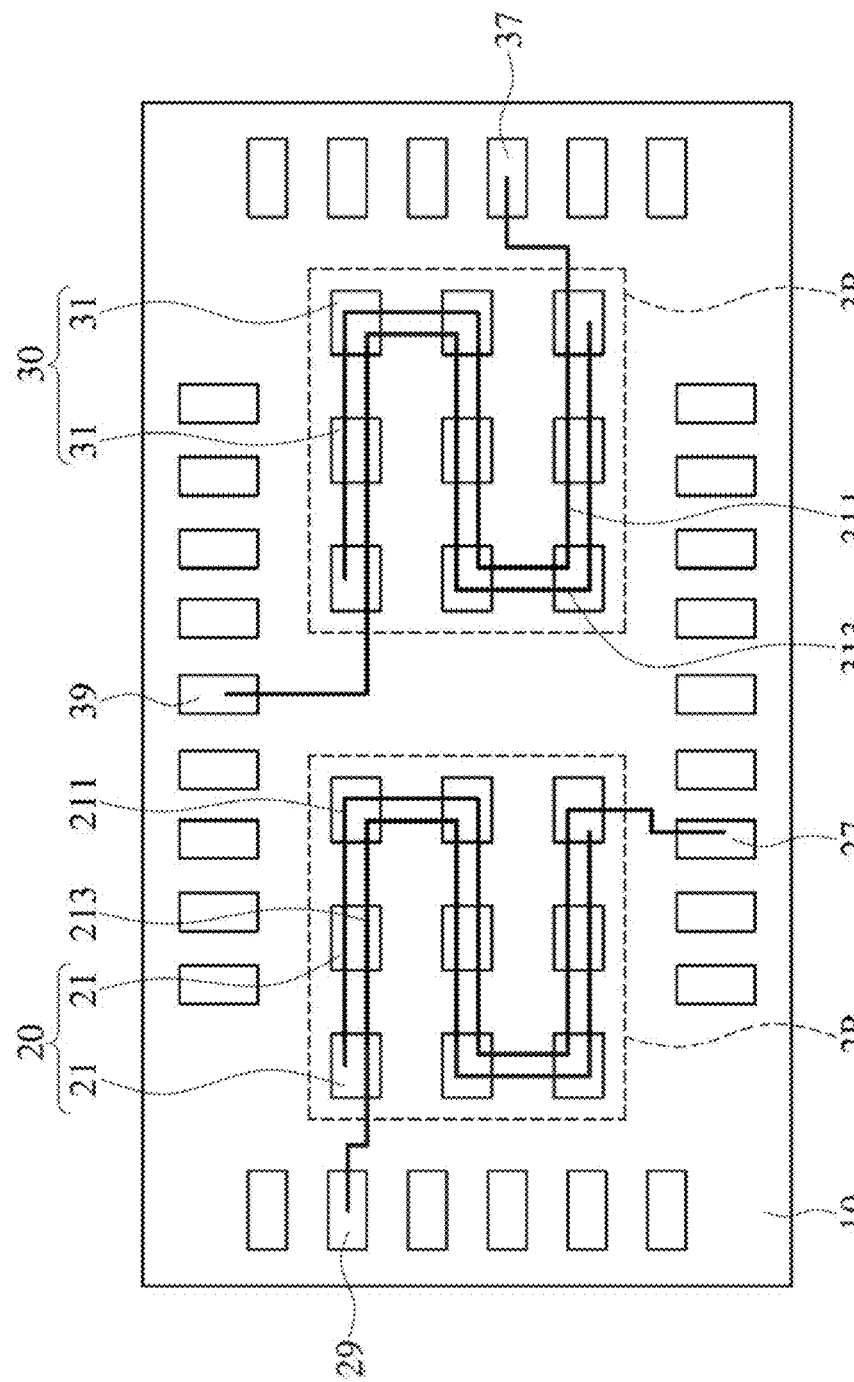
FIG. 5 is a top view of a fourth embodiment of the array-type ultrasonic sensor.

FIG. 5 is a top view of a fourth embodiment of the array-type ultrasonic sensor. As shown in FIG. 5, first ultrasonic sensing units 21 are arranged in a first matrix 2R, and second ultrasonic sensing units 31 are arranged in a second matrix 3R. The first matrix 2R and the second matrix 3R are arranged adjacent to each other. Here, although in the figure, the first ultrasonic sensing units 21 of the first matrix 2R and the second ultrasonic sensing units 31 of the second matrix 3R are jointly arranged in a 3×3 array, but in fact, numbers and shapes of the first ultrasonic sensing units 21 and the second ultrasonic sensing units 31 may be the same or different.

Based on the above, by connecting a plurality of first ultrasonic sensing units 21 in series to form a first sensing array 20, connecting a plurality of second ultrasonic sensing units 31 in series to form a second sensing array 30, and respectively transmitting and receiving ultrasonic waves, various problems in the conventional art can be resolved, so that lightness and thinness can be achieved, thus improving the sound pressure and the sensitivity of sensing.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An array-type ultrasonic sensor, comprising:
   a semiconductor substrate;
   a first sensing array disposed on the semiconductor substrate and comprising a plurality of first ultrasonic sensing units, wherein each of the first ultrasonic sensing units comprises a first positive electrode and a first negative electrode, the first positive electrodes of the first ultrasonic sensing units are connected in series with each other, and the first negative electrodes of the first ultrasonic sensing units are connected in series with each other; and
   a second sensing array disposed on the semiconductor substrate and comprising a plurality of second ultrasonic sensing units, wherein each of the second ultrasonic sensing units comprises a second positive electrode and a second negative electrode, the second positive electrodes of the second ultrasonic sensing units are connected in series with each other, and the second negative electrodes of the second ultrasonic sensing units are connected in series with each other,
   wherein one of the first sensing array and the second sensing array is configured to transmit an ultrasonic wave, and the other is configured to receive a reflected ultrasonic wave, and wherein the first positive electrodes and the second positive electrodes are made of n-type aluminum nitride ($AlN^+$), and the first negative electrodes and the second negative electrodes are made of p-type aluminum nitride ($AlN^-$).

2. The array-type ultrasonic sensor according to claim 1, wherein a number of the first ultrasonic sensing units in the first sensing array is different from a number of the second ultrasonic sensing units in the second sensing array.

3. The array-type ultrasonic sensor according to claim 2, wherein the first ultrasonic sensing units in the first sensing array are arranged in a rectangle, and the second sensing array is surrounded by the rectangle.

4. The array-type ultrasonic sensor according to claim 1, wherein the first ultrasonic sensing units and the second ultrasonic sensing units are jointly arranged in a single array, and the first ultrasonic sensing units are arranged alternately with the second ultrasonic sensing units in the same column and in the same row.

5. The array-type ultrasonic sensor according to claim 4, wherein the first ultrasonic sensing units and the second ultrasonic sensing units are jointly arranged in a matrix, and the first ultrasonic sensing units are arranged alternately with the second ultrasonic sensing units in adjacent oblique lines.

6. The array-type ultrasonic sensor according to claim 1, wherein the first ultrasonic sensing units and the second ultrasonic sensing units are jointly arranged in an array, and the first ultrasonic sensing units are arranged alternately with the second ultrasonic sensing units in a column or in a row.

7. The array-type ultrasonic sensor according to claim 1, wherein a number of the first ultrasonic sensing units in the first sensing array is the same as a number of the second ultrasonic sensing units in the second sensing array.

8. The array-type ultrasonic sensor according to claim 7, wherein the first ultrasonic sensing units are arranged in a first matrix, the second ultrasonic sensing units are arranged in a second matrix, and the first matrix and the second matrix are arranged adjacent to each other.

9. The array-type ultrasonic sensor according to claim 1, wherein a height of a hollow chamber in each of the first ultrasonic sensing units and each of the second ultrasonic sensing units ranges from 0.8 mm to 1.5 mm.

* * * * *